(12) United States Patent
Chu

(10) Patent No.: US 7,107,872 B2
(45) Date of Patent: Sep. 19, 2006

(54) AUXILIARY ACTUATOR FOR THE ENGINE OF REMOTE CONTROL CAR

(76) Inventor: Daimler Chu, P.O. Box 82-144, Taipei (TW)

( * ) Notice: Subject to any disclaimer, the term of this patent is extended or adjusted under 35 U.S.C. 154(b) by 556 days.

(21) Appl. No.: 10/671,836

(22) Filed: Sep. 29, 2003

(65) Prior Publication Data

US 2005/0066757 A1    Mar. 31, 2005

(51) Int. Cl.
*F16H 1/14*    (2006.01)
(52) U.S. Cl. .......................... 74/423; 74/724
(58) Field of Classification Search ................ 74/423, 74/424
See application file for complete search history.

(56) References Cited

U.S. PATENT DOCUMENTS

| | | | |
|---|---|---|---|
| 4,942,780 A * | 7/1990 | Fujisaki et al. ............... | 475/83 |
| 6,478,646 B1 * | 11/2002 | Fukuoka et al. ............ | 440/112 |
| 2002/0040613 A1 * | 4/2002 | Brooks ......................... | 74/423 |
| 2004/0217229 A1 * | 11/2004 | Arlton ...................... | 244/17.11 |
| 2005/0119084 A1 * | 6/2005 | Ishii et al. ..................... | 475/83 |
| 2005/0145210 A1 * | 7/2005 | Lawes ..................... | 123/193.2 |

\* cited by examiner

*Primary Examiner*—David Fenstermacher
(74) *Attorney, Agent, or Firm*—Leong C. Lei

(57) ABSTRACT

An improved auxiliary actuator for the engine of a remote control car is installed at one side of the engine of the remote control car and comprises a driving gear set and a driven gear set. The driving gear set includes a housing, which includes a hollow shaft sheath with a shaft connecting by a 45° angle to a side of the periphery of the housing. A connector is provided on the top of the shaft, while a driving bevel gear is provided at the bottom of the shaft and positioned inside of the housing. The driven gear set includes a cover provided above the housing. The cover has a through hole for receiving a one-way bearing which has a pivot inside. A driven bevel gear being engaged with the driving bevel gear is provided at one end of the pivot, while the other end of the pivot is connected to the engine drive. Accordingly, the engine of the remote control car can be actuated easily and promptly.

9 Claims, 7 Drawing Sheets

AUXILIARY ACTUATOR FOR THE ENGINE OF REMOTE CONTROL CAR

BACKGROUND OF THE INVENTION (a) Technical Field of the Invention

The present invention relates to an improved auxiliary actuator for the engine of remote control cars, particularly to one enabling actuating the engine of the remote control car easily and promptly.

(b) Description of the Prior Art

Taking a prior art disclosed in R.O.C. Patent Publication No. 525524 titled "Actuator for the engine of remote control cars" (as shown in FIG. 7) for example, the structure thereof includes:

(1) an actuating device (not shown) comprising a motor, batteries, reduction gear set and switch, which have circuit connection with each other, such that the motor can drive the reduction gear set which has an output gear having a polyhedral hole;

(2) a driving shaft (not shown) comprising a polyhedral axle at one end for engaging with the polyhedral hole of the actuating device, and a non-circle engagement end at the other end;

(3) a polyhedral axle (not shown) for connecting to the crankshaft of the engine;

(4) an inertia gear set A provided at a side of said engine B includes a driving inertia gear C and a driven inertia gear D, both of which are engaged with each other. The driving inertia gear has a engagement hole E corresponding to the engagement end of the driving shaft, while the driven inertia gear has a polyhedral hole F which has a cross section corresponding to the cross section of the polyhedral axle G such that they can mount and engage with each other. By way of the pivotal connection of the actuating device with the driving axle and the insertion thereof into the engagement hole E, the driving axle can rotate to drive the inertia gear set and subsequently the crankshaft of the engine, thereby actuating the engine.

Given the above-mentioned function, the prior art still has some disadvantages. For example, the inertia gear set is not properly disposed since the engagement hole of the driving inertia gear is provided at the rear portion of the remote control car. When the user is about to actuate the remote control car, he/she must, along the rear end of the car, insert the engagement end of the driving shaft into the engagement hole of the driving inertia gear set. As the position of the engagement hole used to be low when the remote control car is put horizontally, the handle of the actuator will always touch the ground when being operated. There is a need to lift the tail of the car such that the engagement end of the driving shaft can be inserted into the engagement hole of the inertia gear set. In the above-mentioned prior art, although the manually-operated handle has been altered to present a 45° angle for applying to the rope-driving actuator, the user cannot operate the actuator easily for being lack of ergonomic consideration. As such, the user must change his/her gesture to accommodate to the auxiliary actuator.

Furthermore, to insert the engagement end of the driving shaft into the inertia gear set on the rear portion of the remote control car, the driving shaft must be designed as quite long. Besides, as the engagement end of the driving shaft is in form of a circle with two pins, the driving shaft can only be adapted to the engagement hole of the inertia gear set, rather than to the other screws on the remote control car for detaching purposes. General remote control car players would frequently adjust fasteners during the operation, it would be quite a burden for them to prepare and bring additional tools. Not to mention that the aforementioned driving shaft is great in size and inconvenient to carried with.

Accordingly, there is a need for improvement of the auxiliary actuator for the engine of remote control cars.

SUMMARY OF THE INVENTION

The primary object of the invention is to provide an improved auxiliary actuator for the engine of remote control cars, such that the user can easily operate the remote control cars.

The secondary object of the invention is to provide an improved auxiliary actuator for the engine of remote control cars, which is conform to the ergonomic requirement for human actions, since the user need not pick up the remote control car since the crankshaft of the engine is driven by the actuator and therefore the remote control car can be simply put on the ground for actuation. Besides, as the driving shaft is not too long in size, the remote control car is easy carried.

To obtain the above purposes, the improved auxiliary actuator for the engine of a remote control car according to the invention, being installed at one side of the remote control car, comprises:

(a) a driving gear set, which includes a housing having an inside receiver and a hollow shaft sheath going through the receiver and connecting by a 45° angle to a side of the periphery of the housing; a shaft goes through the hollow shaft sheath such that the shaft is also connected to the housing by a 45° angle to a side of the periphery of the housing; a connector is provided on the top of the shaft, while a driving bevel gear is provided at the bottom of the shaft and positioned in the receiver of the housing;

(b) a driven gear set, which includes a cover provided above the receiver of the housing; the cover has a through hole for receiving a one-way bearing which has a pivot inside; a driven bevel gear being engaged with the driving bevel gear is provided at one end of the pivot, while the other end of the pivot is connected to the engine drive.

Being installed at one side of the remote control car, the invention can serve as an auxiliary actuator for the engine of the remote control car, such that the user can easily actuate the engine of the remote control car without wasting unnecessary time and effort.

The novelty and many other advantages of the invention will become more readily appreciated as the same becomes better understood by reference to the following detailed description, when taken in conjunction with the accompanying drawings.

DETAILED DESCRIPTION OF THE PREFERRED EMBODIMENT

Figure 1:
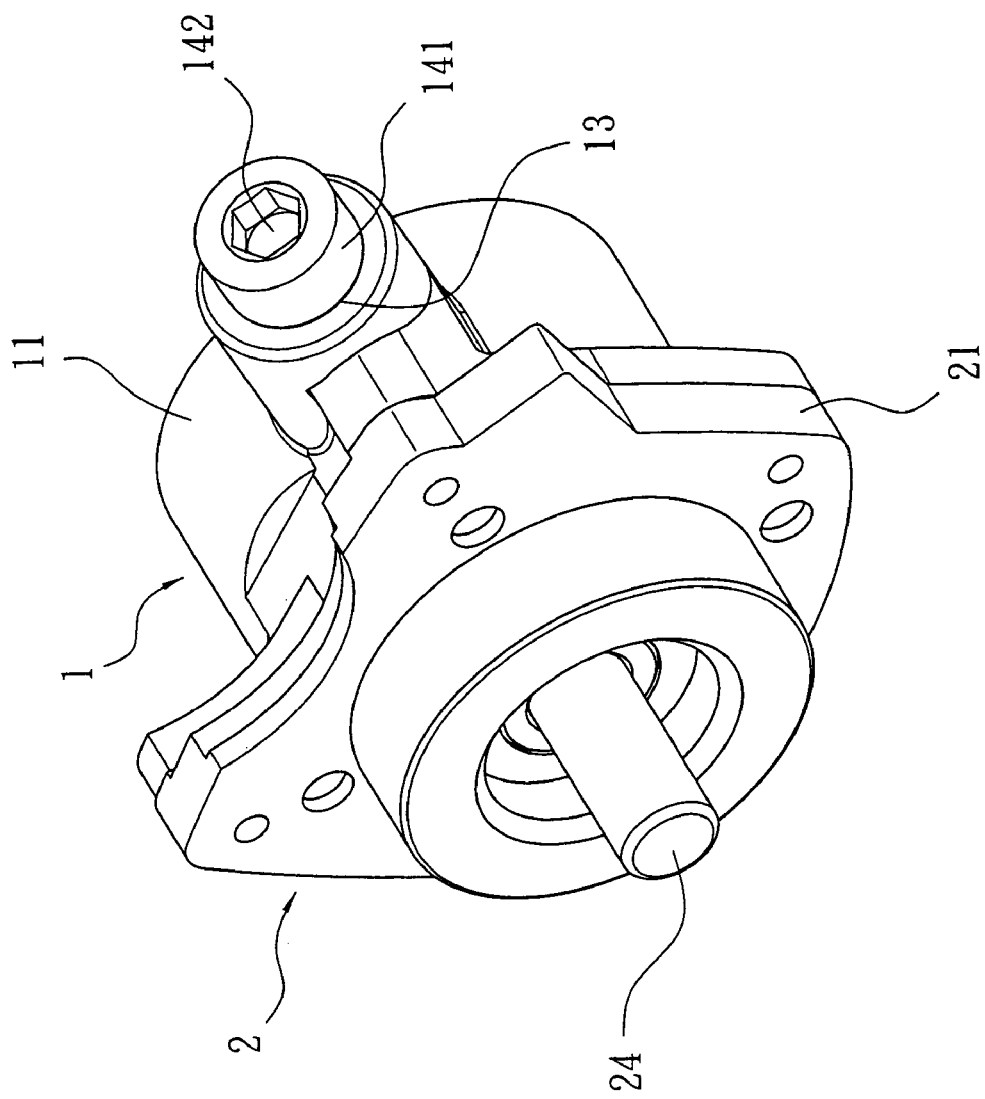
FIG. 1 is a perspective view of the invention.
Figure 2:
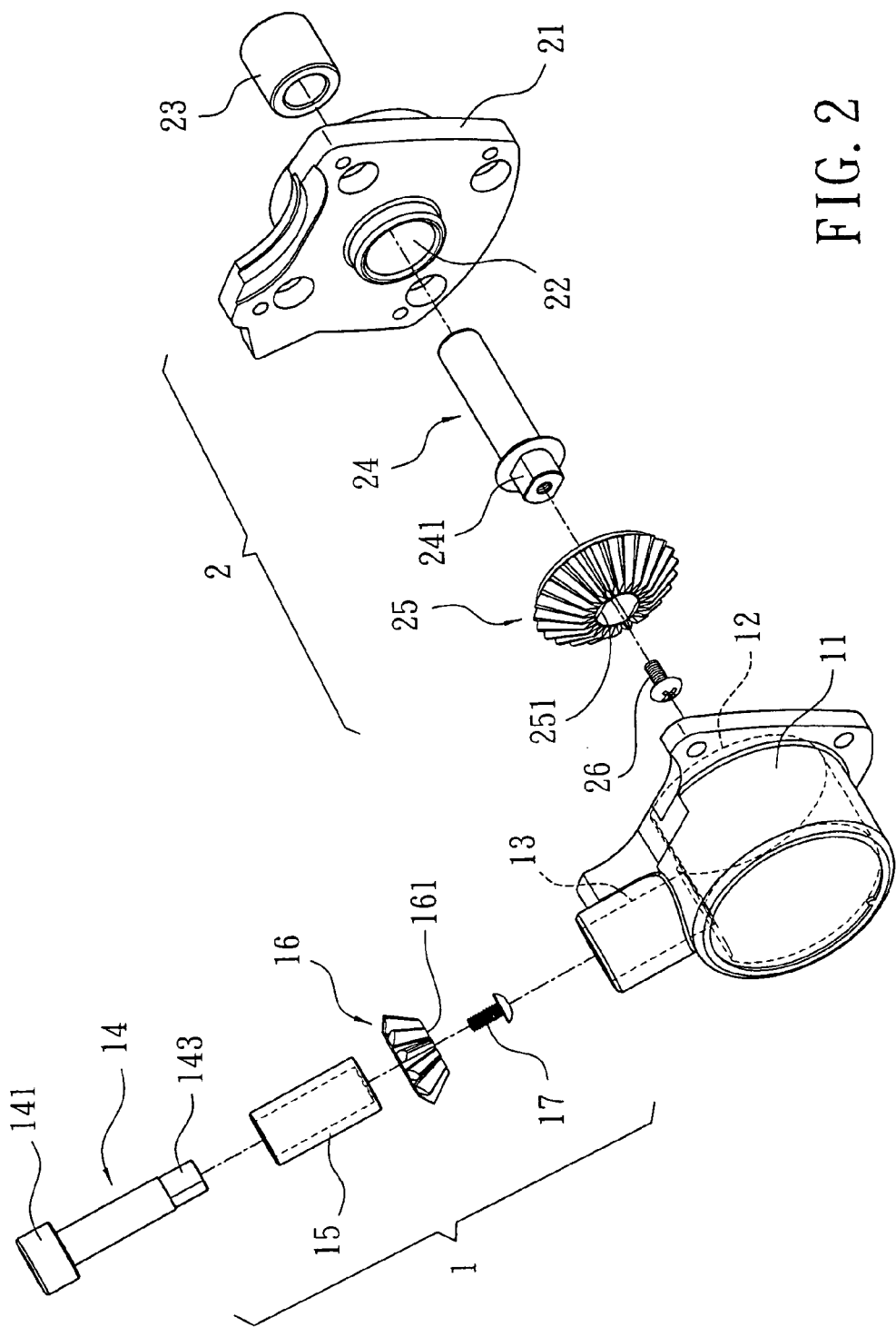
FIG. 2 is an exploded view of the invention.
Figure 5:
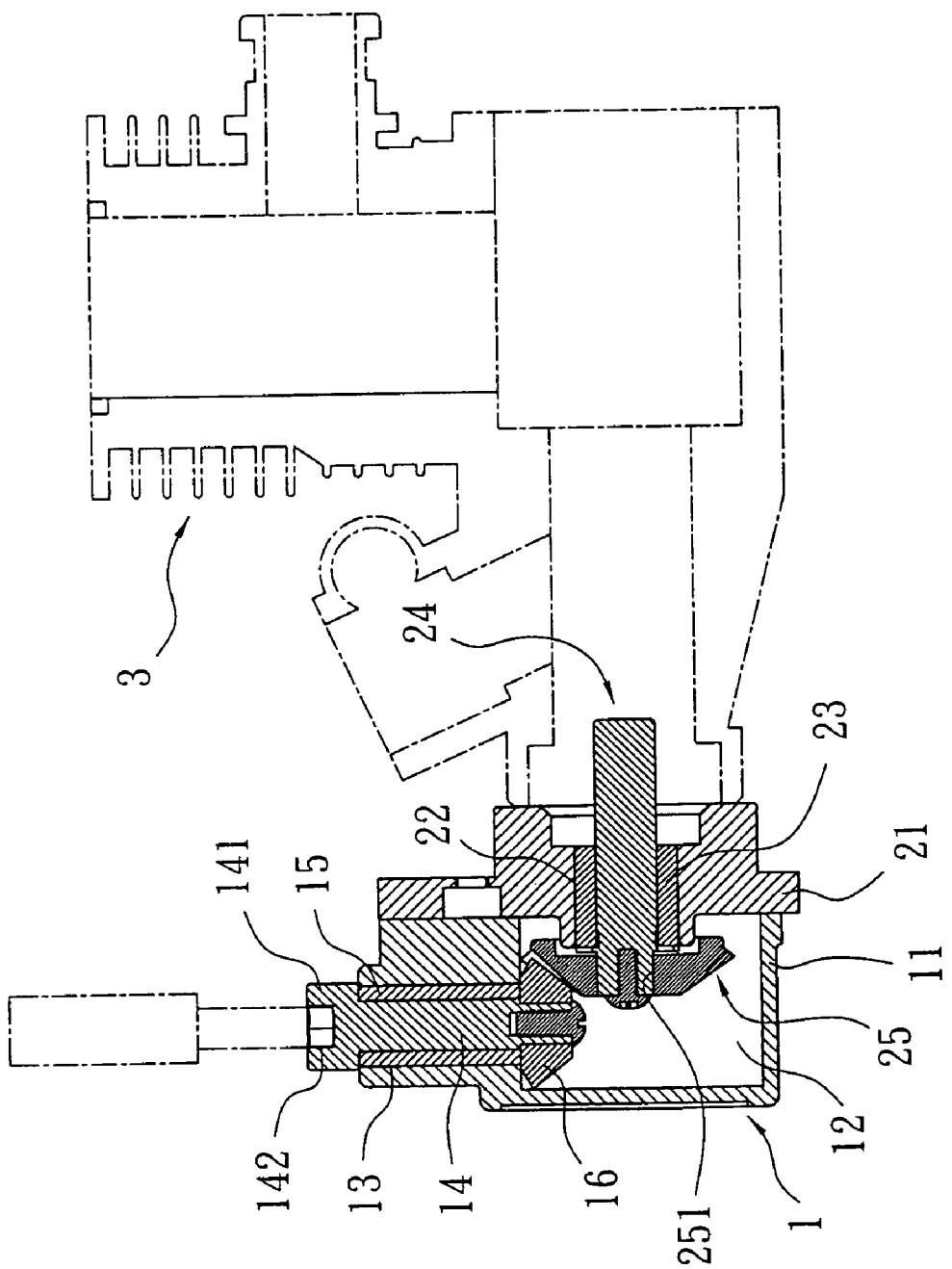
FIG. 5 shows the invention in use status.

Referring to FIGS. 1 and 2, the invention discloses an improved auxiliary actuator for the engine of a remote control car, comprising a driving gear set 1 and a driven gear set 2, is installed at one side of the engine 3 of the remote control car (as shown in FIG. 5) for serving as an auxiliary actuator for the engine 3 of a remote control car, such that the user can easily actuate the engine 3 of the remote control car without wasting unnecessary time and effort.

The driving gear set 1 includes a housing 1, which includes a hollow shaft sheath 13 with a shaft 14 connecting by a 45° angle through to a side of the periphery of the housing 11. A connector 141, whose end surface is in the form of a hexagonal hollow 142, is provided on the top of the shaft 14. A driving bevel gear 16 is provided at the bottom of the shaft 14 and positioned inside of the housing 12. The shaft 14 has a plane 143 at one end, while the inner rim of the driving bevel gear 16 is correspondingly provided with a plane 161, such that the shaft 14 and the driving bevel gear 16 can engage with each other by way of said two planes 143, 161 to present a locking status. A threaded hole is provided at the end surface of the shaft 14 for adapting a fastener 17, such that the driving bevel gear 16 can be fastened to the end of the shaft 14.

The driven gear set 2 includes a cover 21 provided on the opening of the receiver 12 above the housing 11. The cover 21 has a through hole 22, inside of which is engaged with a one-way bearing 23 for a pivot 24 to pass through. A driven bevel gear 25 is provided at one end of the pivot 24. A plane 241 is provided on the shaft at one end of the pivot 24, while a plane 251 is correspondingly provided on the inner rim of the driven bevel gear 25m such that the pivot 24 and the driven bevel gear 25 engage with each other by way of said two planes 241, 251 to present a locking status. A fastener 26 goes through the inner rim of the bevel gear 25 to fasten the driven bevel gear 25 to the end of the pivot 24. The driven bevel gear 25 is engaged with the driving bevel gear 16, while the other end of the pivot 24 is connected to the engine 3 drive. Accordingly, an auxiliary actuator for the engine of the remote control car is formed.

Figure 3:
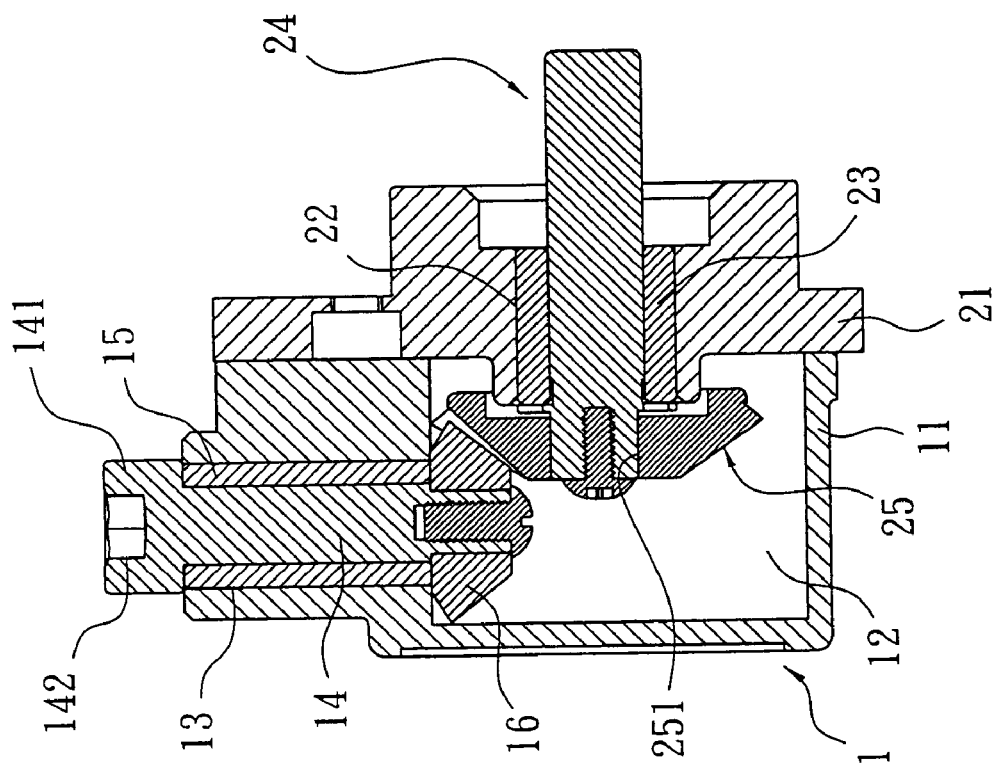
FIG. 3 is a cut-away view showing the structure of the invention.
Figure 4:
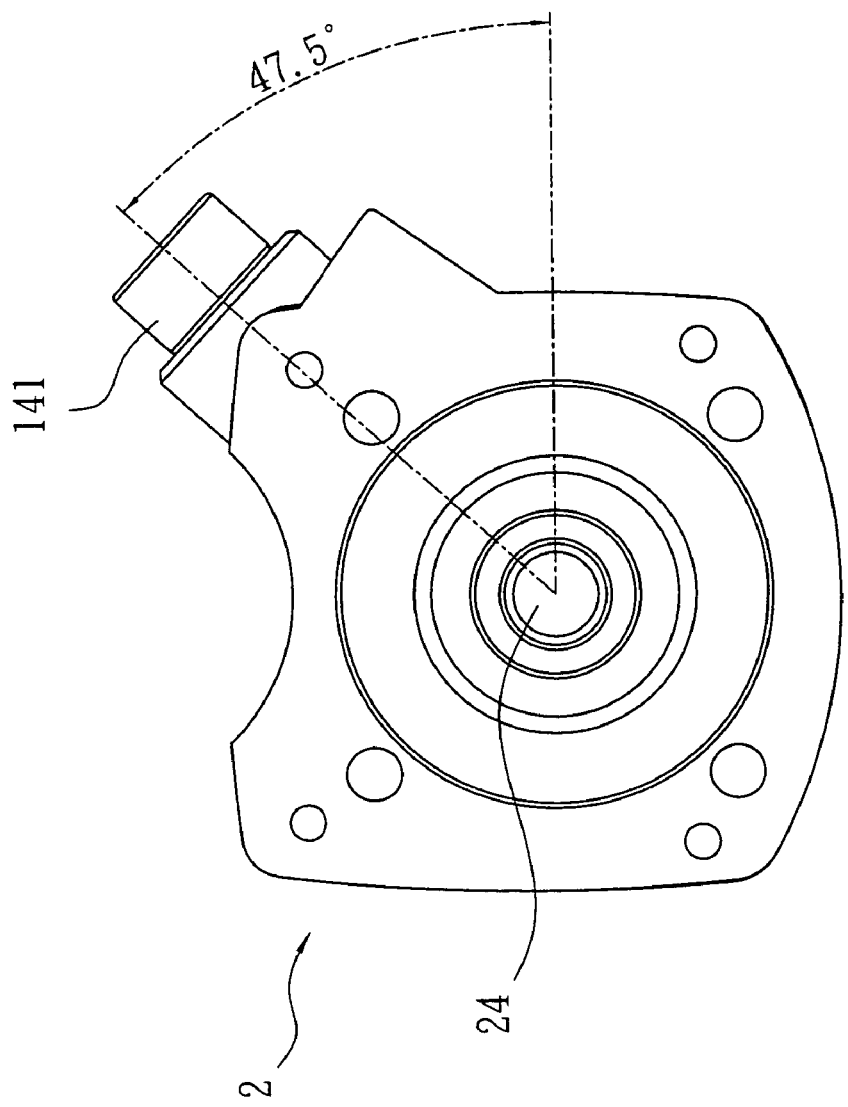
FIG. 4 is a rear view of the intention after being assembled.

Referring to FIGS. 3 and 4, generally, remote control car players would go outdoors with a toolbox carrying exchangeable components and tools which used to be electric ones connectable to hexagonal shafts for detaching components. However, when actuating the engine according to the present invention, there is no need to additionally carry different type of actuating shafts. The user may simply use an electric tool connecting with a hexagonal shaft, which is adapted to the hexagonal hollow 142 in the shaft 14 at the top of the driving gear set 1, such that the electric tool connecting with a hexagonal shaft can engage with the shaft 14 having a hexagonal hollow on the top. As the shaft 14 is provided by a 45° angle to a side of the periphery of the housing 11, it is easily seen by the user, and is thus conform to the ergonomic requirement for human actions. The user can easily mount the shaft of the electric tool onto the top of the shaft 14, such that when the shaft of the electric tool rotates, the driving gear set 1 will rotate inside of the hollow shaft sheath 13, and subsequently drive the driving bevel gear 16 to rotate. In view of the engagement of the driving bevel gear 14 and the driven bevel gear 25, the driven bevel gear 25 will rotate to drive pivot 24. Accordingly, the engine 3 drive at the other end of the pivot 24 will rotate and actuate the engine 3 of the remote control car.

As a one-way bearing 23 goes through the pivot 24, when the driving bevel gear 16 drives the pivot 24 of the driven bevel gear 25 to rotate and subsequently actuates the engine 3 of the remote control car, the engine 3 will generate high speed at once. To avoid the engine 3 tugging the driving bevel gear 16 and making the user unable to withdraw the shaft of the electric tool from the actuator, the invention is provided with a one-way bearing 23 inside of the pivot 24, such that when the engine 23 is actuated, the pivot 24 will detach from the pivot 24 without rotating with each other, so as the driving gear set 1 and the driven gear set 2.

Figure 6:
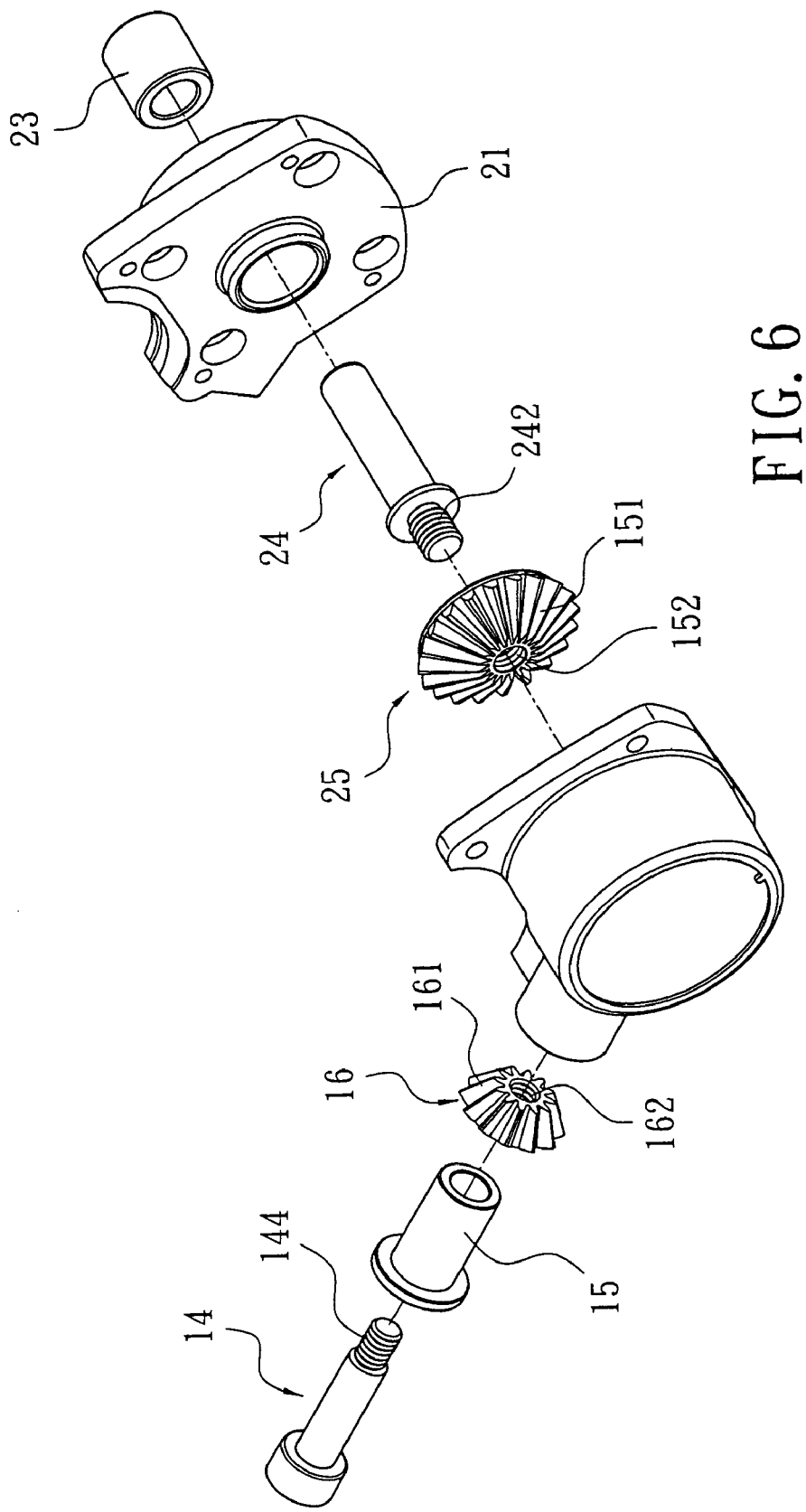
FIG. 6 is an exploded view of another embodiment of the invention.
Figure 7:
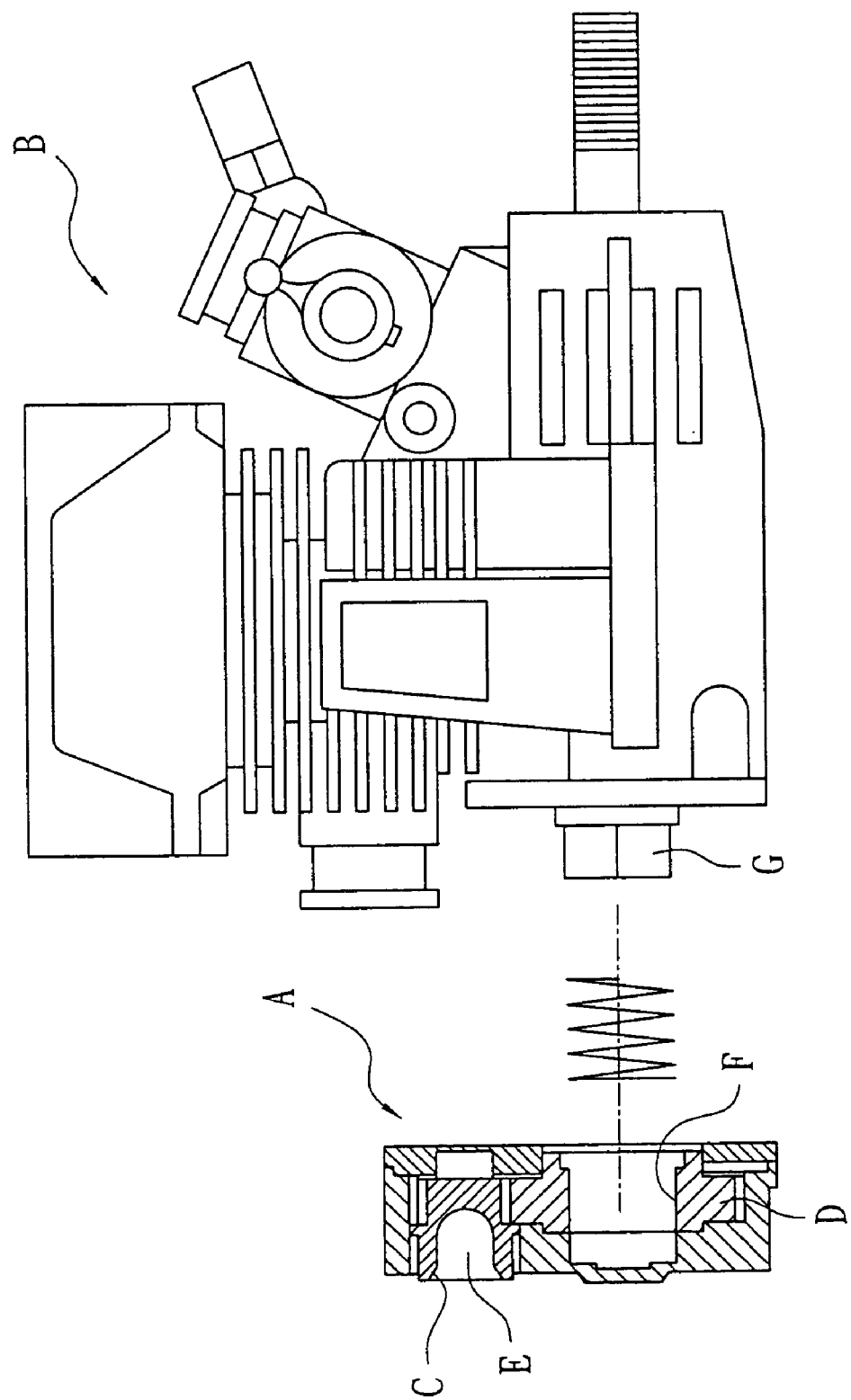
FIG. 7 is a cut-away view of an auxiliary actuator for an engine according to the prior art.

As shown in FIG. 6, in another embodiment of the invention, exterior threads 144 can be provided at the end of the shaft 14 and the interior hole 162 of the driving bevel gear 16, such that said exterior threads 144 on the shaft 14 may go through the copper sheath 15 and engage with the threaded hole 162 of the driving bevel gear 16. Likewise, exterior threads 242 can be provided at the end of the pivot 24 and the interior hole 252 of the driven bevel gear 25, such that said exterior threads 242 on the pivot 24 and the threaded hole 252 of the driven bevel gear 25 can be engaged with each other. Accordingly, the assembly can be firmly fastened. While the pivot 24 rotates clockwise as usual, the exterior threads 242 can be set as dextrotary for the purpose of further fastening, so is the direction of the shaft 14 and the exterior threads 144.

Concluded above, the invention is neat in terms of components and their assemblage, which is novel to the design of a engine actuator mechanism for the present remote control cars, and the efficiency is highly improved. Accordingly, the inventor has claimed his invention. Although specific embodiments have been illustrated and described, it will be obvious to those skilled in the art that various modifications may be made without departing from what is intended to be limited solely by the appended

I claim:

1. An improved auxiliary actuator for the engine of a remote control car, which is installed at one side of the remote control car and comprises:

(a) a driving gear set, which includes a housing having an inside receiver and a hollow shaft sheath going through the receiver and connected by a 45° angle to a side of the periphery of the housing; a shaft goes through the hollow shaft sheath such that the shaft is also connected to the housing by a 45° angle to a side of the periphery of the housing; a connector is provided on the top of the shaft, while a driving bevel gear is provided at the bottom of the shaft and positioned in the receiver of the housing;

(b) a driven gear set, which includes a cover provided above the receiver of the housing; the cover has a through hole for receiving a one-way bearing which has a pivot inside; a driven bevel gear being engaged with the driving bevel gear is provided at one end of the pivot, while the other end of the pivot is connected to the engine drive.

2. The improved auxiliary actuator for the engine of a remote control car according to claim 1, wherein a copper sheath is installed in-between the shaft and the hollow shaft sheath.

3. The improved auxiliary actuator for the engine of a remote control car according to claim 1, wherein the shaft has a plane at one end, while the inner rim of the driving bevel gear is correspondingly provided with a plane, such that the shaft and the driving bevel gear can engage with each other by way of said two planes to present a locking status.

4. The improved auxiliary actuator for the engine of a remote control car according to claim 1, wherein the driving bevel gear is fastened to the end of the shaft by way of a fastener.

5. The improved auxiliary actuator for the engine of a remote control car according to claim 1, wherein the end surface of the connector is in the form of a hexagonal hollow.

6. The improved auxiliary actuator for the engine of a remote control car according to claim 1, wherein the pivot has a plane at one end, while the inner rim of the driven bevel gear is correspondingly provided with a plane, such that the pivot and the driven bevel gear can engage with each other by way of said two planes to present a locking status.

7. The improved auxiliary actuator for the engine of a remote control car according to claim 1, wherein the driven bevel gear is fastened to the end of the pivot by way of a fastener.

8. The improved auxiliary actuator for the engine of a remote control car according to claim 1, wherein exterior threads can be provided at the end of the shaft and the interior hole of the driving bevel gear, such that said exterior threads on the shaft and the threaded hole of the driving bevel gear can be engaged with each other.

9. The improved auxiliary actuator for the engine of a remote control car according to claim 1, wherein exterior threads can be provided at the end of the pivot and the interior hole of the driven bevel gear, such that said exterior threads on the pivot and the threaded hole of the driven bevel gear can be engaged with each other.

* * * * *